(12) United States Patent
Grehant

(10) Patent No.: US 10,949,425 B2
(45) Date of Patent: Mar. 16, 2021

(54) RETRIEVAL OF OUTCOMES OF PRECOMPUTED MODELS

(71) Applicant: DASSAULT SYSTEMES, Velizy Villacoublay (FR)

(72) Inventor: Xavier Grehant, Columbes (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 328 days.

(21) Appl. No.: 15/395,229

(22) Filed: Dec. 30, 2016

(65) Prior Publication Data
US 2017/0193049 A1 Jul. 6, 2017

(30) Foreign Application Priority Data
Dec. 31, 2015 (EP) ..................................... 15307195

(51) Int. Cl.
G06F 16/2455 (2019.01)
G06F 16/22 (2019.01)
G06N 20/00 (2019.01)
G06F 16/35 (2019.01)

(52) U.S. Cl.
CPC ........ *G06F 16/24553* (2019.01); *G06F 16/22* (2019.01); *G06F 16/2272* (2019.01); *G06F 16/35* (2019.01); *G06N 20/00* (2019.01)

(58) Field of Classification Search
CPC .................................................... G06N 20/20
See application file for complete search history.

(56) References Cited

U.S. PATENT DOCUMENTS

| | | | |
|---|---|---|---|
| 7,359,842 B1 * | 4/2008 | Tsutsui | G06K 9/6298 703/2 |
| 8,290,883 B2 * | 10/2012 | Takeuchi | G06N 20/00 706/12 |
| 8,762,299 B1 | 6/2014 | Breckenridge et al. | |
| 2012/0284213 A1 | 11/2012 | Lin et al. | |
| 2013/0103617 A1 | 4/2013 | Desai | |
| 2014/0046879 A1 | 2/2014 | Maclennan et al. | |
| 2014/0188768 A1 | 7/2014 | Bonissone et al. | |
| 2014/0258189 A1 | 9/2014 | Schmidt | |

(Continued)

FOREIGN PATENT DOCUMENTS

| | | |
|---|---|---|
| EP | 2 940 606 A1 | 11/2015 |
| JP | 2007-41950 | 2/2007 |

(Continued)

OTHER PUBLICATIONS

Lindholm et al., The Java(tm) Virtual Machine Specification 99, Sun Microsystems, https://docs.oracle.com/javase/specs/jvms/se6/html/ConstantPool.doc.html.*

(Continued)

*Primary Examiner* — Jason G Liao
(74) *Attorney, Agent, or Firm* — Oblon, McClelland, Maier & Neustadt, L.L.P.

(57) ABSTRACT

The invention notably relates to a computer-implemented method for retrieving model outcomes in the course of an event. The method comprises providing variables of a first set of observations of similar events, providing a multiplicity of models, indexing the multiplicity of models with the variables of the first set of observations, querying a model according to one or more variables, and returning, as a result of the query, a model.

11 Claims, 3 Drawing Sheets

| Variable | Value | Model 1 | Model 2 | Model 3 |
|---|---|---|---|---|
| V1 | v1 | Model ID1 | Model ID2 | |
| V1 | v2 | Model ID1 | | Model ID3 |
| V2 | v3 | | Model ID2 | Model ID3 |

(56) References Cited

U.S. PATENT DOCUMENTS

| | | | |
|---|---|---|---|
| 2015/0006442 A1 | 1/2015 | Ogilvie et al. | |
| 2015/0157273 A1* | 6/2015 | An | A61B 5/1121 600/301 |
| 2016/0063094 A1* | 3/2016 | Udupa | G06F 16/3322 707/748 |

FOREIGN PATENT DOCUMENTS

| | | |
|---|---|---|
| WO | WO 02/06953 A1 | 1/2002 |
| WO | WO 2015/126858 A1 | 8/2015 |

OTHER PUBLICATIONS

Mathematica Quick Revision History [date unknown], Wolfram.com, Mathematica Quick Revision History.*

Bermúdez-Chacón et al., Automatic problem-specific hyperparameter optimization and model selection for supervised machine learning: Technical Report, Technical Report 2015, ETH Zurich, 42 pages.*

Chawla et al., SMOTE: Synthetic Minority Over-sampling Technique Jun. 2, Journal of Artificial Intelligence Research vol. 16, 321-57.*

Thorton et al., Auto-WEKA: combined selection and hyperparameter optimization of classification algorithms, KDD '13: Proceedings of the 19th ACM SIGKDD international conference on Knowledge discovery and data mining p. 847-855.*

Luo, A review of automatic selection methods for machine learning algorithms and hyper-parameter values May 23, 2016, Springer-Verlaag, 15 pages.*

Extended European Search Report dated Jun. 30, 2016 in Patent Application No. 15307195.6.

Extended European Search Report dated Jun. 30, 2016 in Patent Application No. 15307196.4.

Extended European Search Report dated Jun. 30, 2016 in Patent Application No. 15307194.9.

Extended European Search Report dated Jun. 30, 2016 in Patent Application No. 15307193.1.

Office Acton dated Dec. 22, 2020 in Japan Patent Application No. 2016-255145 (with English translation); 10 pages.

Office Action dated Jan. 5, 2021 in corresponding Japanese Patent Application No. 2016-255137 with English Translation.

* cited by examiner

| Variable | Value | Model 1 | Model 2 | Model 3 |
|---|---|---|---|---|
| V1 | v1 | Model ID1 | Model ID2 | |
| V1 | v2 | Model ID1 | | Model ID3 |
| V2 | v3 | | Model ID2 | Model ID3 |

RETRIEVAL OF OUTCOMES OF PRECOMPUTED MODELS

CROSS-REFERENCE TO RELATED APPLICATIONS

This application claims priority under 35 U.S.C. § 119 or 365 to European Application No. 15307195.6, filed Dec. 31, 2015. The entire contents of the above application(s) are incorporated herein by reference.

FIELD OF THE INVENTION

The invention relates to the field of computer programs and systems, and more specifically to a method, system and program for retrieving model outcomes in the course of an event.

BACKGROUND

Recommendations are used for decision making in engineering. For instance, in an ongoing satellite launch, recommending emergency actions is needed to minimize a function of the risk of incidents (e.g. controlling the temperature of the fuel tanks, fuel consumption, speed of the launcher . . . ) Recommendations are not limited to the control of a device, but they can also be used during the conception and the manufacturing of a device, e.g. a CAD system can provide recommendations for the design of a device so that the risk of malfunctioning of the designed device is minimized.

There are several known categories of recommendation systems. A first category comprises the so-called recommender systems that are systems in which a visitor receives content suggestions based on the contents already visited. For instance, a search engine ranks search results based on personal history of pages visited. Examples of such systems are discussed in Balabanović, Marko, and Yoav Shoham. "*Fab: content-based, collaborative recommendation.*" Communications of the ACM 40.3 (1997): 66-72, or also in Sarwar, Badrul, et al. "*Item-based collaborative filtering recommendation algorithms.*" Proceedings of the 10th international conference on World Wide Web. ACM, 2001.

However, these recommender systems work in applications that centralize the history of a large number of users. For example Google© search has more than 1 billion users. Systems that are hosted on the server of a company do not have such a pool of decision-makers to learn from. Decision-makers typically use best business practice or management consulting firms for advice based on accumulated experience of their peers in similar situations. But the relative isolation of business, operational and equipment data from different companies make it difficult to automate this learning process by computer programs. So rather than looking at the history of decisions from their peers, decision-makers assess situations based on data descriptive of the situation that triggers the need for a decision (variables descriptive of their own operations and equipment for instance). Therefore, these recommender systems are not suited for these situations.

A second category comprises the expert systems that automate decision making related to certain problem, based on rules written by experts and applied automatically. When the number of options is small and the input variables are manageable by a person, or processed to be summarized in a manageable set of discriminative variables, then it is possible for an expert to specify rules that will produce the optimal action in most cases. The first approach is called "expert rules only" wherein the rules are manually written by an expert of the technical filed on which the system will be applied. The second approach is called "expert rules combined with empirical models" in which an empirical model is built based on machine learning to process the available inputs and return a manageable number of inputs. Such models would typically return an estimated probability. The room for human error is reduced because the complexity of the inputs provided to human-written rules is reduced.

However, this second category suffers many drawbacks; notably, the first approach does not work when the number of independent factors and the number of options lead to a problem not manageable by a human expert. The second approach requires substantial hardware resources to train empirical models. In practice the need for decisions is typically triggered by new data. And decisions typically have to be taken quickly. Thus further restraining the amount of resources available and the number of cases where these systems can be used.

An example of empirical models, include the empirical rule generation systems such as Delmia OI©. These systems illustrate the complexity required to handle such phenomena. Empirical rule generation systems model phenomena described by large numbers of variables. They work by producing many rules with individually low recall and low precision, and therefore potentially mutually contradictory, resolving their different outcomes with a vote, and outputting the result of the vote, which is used as a new synthetic variable to describe the situation. These systems typically achieve simultaneously high recall and high precision (above 80% each) but to do so, produce an unmanageable number of rules (to the order of tens of thousands to millions for a few dozen variables) that could not have been produced by experts.

Such systems can be successfully used in approach "expert rules combined with empirical models" in cases with many input parameters and two decision alternatives.

However, such empirical models do not let decision-makers take into account data that did not exist or was not taken into account when training the systems and writing the expert rules. In addition, empirical models may require may require substantial hardware resources to train. In practice the need for decisions is typically triggered by new data. And decisions typically have to be taken quickly. Thus further restraining the amount of resources available and the number of cases where these systems can be used.

A third category comprises understandable models, representations and interactive interfaces that help make decisions, by presenting the relevant information in a form that makes it manageable by the decision-makers or their aids. For instance, Business Intelligence tools provide means to select variables and visualize their interactions for instance by way of scatter plots. Analysts pick relevant visualizations, produce static reports and send them to decision-makers.

The so-called "Whitebox models" rely on empirical (trained) model giving a visualization or explanation of the relationships between the variables. For instance, after training decision trees (as discussed for example in Quinlan, J. Ross. "*Induction of decision trees.*" Machine learning 1.1 (1986): 81-106. [1]), rules building engine, or bayesian networks (as discussed for example in Heckerman, David, Dan Geiger, and David M. Chickering. "*Learning Bayesian networks: The combination of knowledge and statistical data.*" Machine learning 20.3 (1995): 197-243), it is possible to understand the rules that, with some probability, link a target variable to a number of premises among the variables that describe the phenomenon.

When input data can be represented in a graph, techniques exist to map the graph into a 2-dimensional drawing in such a way that the distance between two entities on the 2D map is representative of their connectivity in the graph. These techniques allow to qualitatively represent the degree of interaction between elements descriptive of the situation. These techniques can also be applied to map complex observations on a 2D map so that similar observations (close in N dimensions, where the dimensions are the variables descriptive of the observations) end up close to one another on the 2D map, as discussed for example in Balasubramanian, Mukund, and Eric L. Schwartz. "*The isomap algorithm and topological stability.*" Science 295. 5552 (2002): 7-7.

Clustering techniques are discussed in Jain, Anil K., M. Narasimha Murty, and Patrick J. Flynn. "*Data clustering: a review.*" ACM computing surveys (CSUR) 31.3 (1999): 264-323 and these clustering techniques allow to group together in a manageable number of groups observations that are similar in N dimensions.

Dimension reduction techniques are discussed in Wall, Michael E., Andreas Rechtsteiner, and Luis M. Rocha. "*Singular value decomposition and principal component analysis.*" A practical approach to microarray data analysis. Springer US, 2003. 91-109, and they allow to find the dimensions, or combination of dimensions, along which data varies the most.

Other techniques exist to find what dimensions (descriptive variables) have the highest impact on the value of a given target variable.

However, the "Whitebox models" suffer several drawbacks. Notably, these systems still do not provide fully automated decisions and therefore allow for suboptimal decisions due to human error such as omission of an important factor or inaccurate estimate of the actual impact of the factors taken into account.

Another problem is that this third category requires substantial hardware resources to train. In practice the need for decisions is typically triggered by new data. And decisions typically have to be taken quickly. Thus further restraining the amount of resources available and the number of cases where these systems can be used.

More specifically, a direct use of empirical models suffers the following performance problems when directly used to model realistic events involving complex systems.

The first performance problem is related to memory footprint problem. The number of relevant parameters is typically large to describe a situation involving a complex system. Hence describing the situation in its entirety with the input variables of the model would result in a proliferation of input variables that would make training a model unrealistic during the course of an event.

As variables proliferate, so do the number of observations necessary in the training data. In brief, the observations in the training data must be representative of all possible combinations of variables that can actually occur for the trained model to perform correctly.

Most of the available machine-learning methods are designed by assuming that the training data fits in random access memory. The available size of random access memory typically puts a limit to the parameters that can be taken in account to describe the situation.

The second performance problem is a problem of salability. Some precise machine learning algorithms don't scale well. It is the case for example with boosting techniques. Boosting techniques are currently among the most powerful machine learning techniques for recall and precision but they are sequential in essence. This means they cannot be distributed across multiple servers. One server will be busy running the computation while the others will stay idle. The time to run sequential algorithms will not decrease as the number of servers increases.

The same memory footprint and scalability problems apply when retraining the model during the course of an event.

In addition, since time is limited, latency becomes also a problem. Depending on the model, on the size of the training data, and on the available hardware resources training a model takes seconds to weeks. When realistic situations involving complex systems are modeled, in most cases training a model must take at least several dozens of seconds. Hence opportunities to train a model during the course of an event will be small.

Within this context, there is still a need for an improved method for retrieving model outcomes in the course of an event.

SUMMARY OF THE INVENTION

It is therefore provided a computer-implemented method for retrieving model outcomes in the course of an event. The method comprises:
  providing variables of a first set of observations of similar events;
  providing a multiplicity of models;
  indexing the multiplicity of models with the variables of the first set of observations;
  querying a model according to one or more variables;
  returning, as a result of the query, a model.
The method may comprise one or more of the following:
  training the multiplicity of models based on the variables of the first set of observations; indexing the multiplicity of model with the variables used to train each model;
  training the multiplicity of models further comprises: computing subsets of the observations of the first set by applying a filtering on the variables of the first set of observations; training each model of the multiplicity of models on one of the subsets of the observations of the first set; and indexing each model of the multiplicity of models with the values of the variables of the observations used to train the said each model.
  determining that two or more models are returned; and ranking the returned two or more models, the ranking being based on the variables of the returned two or more models;
  the returned two or more models are ranked by computing, for each returned model, a distance based on a proximity measure between the values of the variables of the model and the values of the corresponding one or more variables in the query;
  building the first set of observations further comprises generating the outcome of at least one observation from a simulation;
  at least one observation of the first set is randomly generated;
  collecting a second set of observations representing events that are similar to the events of the first set, the observations of the second set comprising at least the same variables as the first set; and wherein the query of a models is performed according to one or more variables of a second set of observations;

providing one or more observations, each variable of the provided one or more observations being set with a value; computing an outcome for each one of the one or more observations, the computation being performed by applying the returned model on the variables set with a value of the provided one or more observations;

at least two observations are provided and the method further comprises ranking the outcomes computed for the provided one or more observations; and selecting one of the provided at least two observations that is associated with the outcome having the highest ranking;

the model is a simulation model or a machine learning model;

the one or more variables for querying a model are slowly moving variables;

one or more variables of the first set of observations are generated with a random variate generator;

one or more variables of the first set of observations are generated by selecting discrete values on a range of definition of the variable;

the outcomes computed for the provided one or more observations are computed by averaging the individual response of the returned model if the response of the returned model is numerical values;

the outcomes computed for the provided one or more observations are computed by taking the value that is most frequently found in response of the returned model;

at computing subsets of the observations of the first set by applying a filtering on the variables of the first set of observations, the observations of the subset belong to a common cluster of observations;

the returned model has an exact match between the metadata of the model and the values specified in the query;

values of variables entered in a query are approximated by discrete variables that match the discrete variables of the observations of the second set;

the query allow for the retrieval of a model based on an approximate match between the metadata of the model and the values of variables specified in the query;

indexing the multiplicity of models further comprises adding, for each model of the multiplicity, the values of all observations used to train the said each model in the metadata of the said each model of the multiplicity;

indexing a model further comprises adding to the metadata of the model to be indexed a function of the observations used to train the model, such as the coordinates of their centroid.

It is further provided a computer program comprising instructions for performing the above method.

It is further provided a computer readable storage medium having recorded thereon the computer program.

It is further provided a system comprising a processor coupled to a memory, the memory having recorded thereon the computer program.

The server may be connected with a client computer on which the query on the index is generated.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
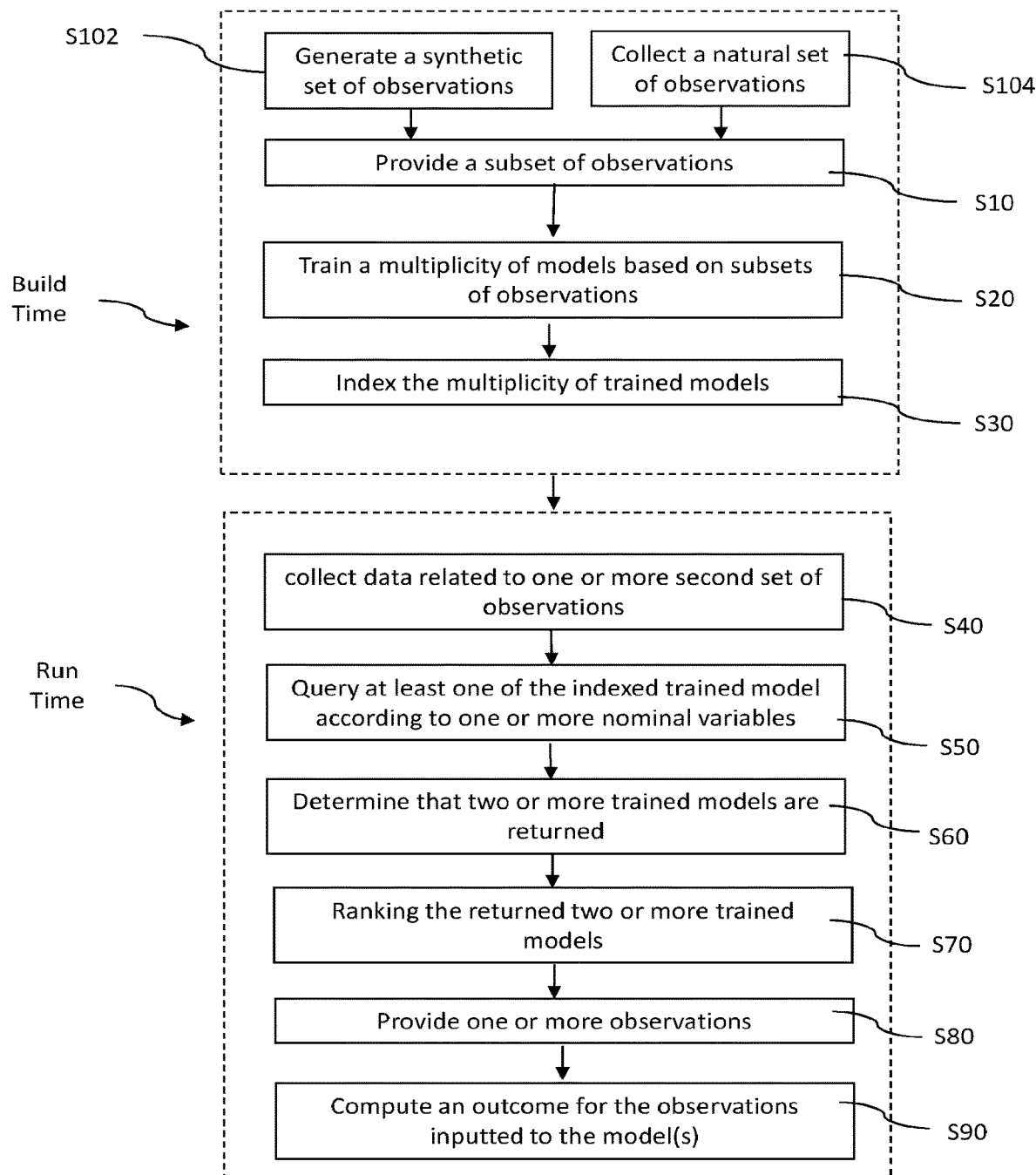
FIG. 1 shows a flowchart of an example of training a model.

With reference to the flowcharts of FIG. 1, it is proposed a computer-implemented method for retrieving model outcomes in the course of an event. The method comprises providing variables of a first set of observations of similar events. The method further comprises providing a multiplicity of models. The method also comprises indexing the multiplicity of models with the variables of the first set of observations. The method further comprises querying a model according to one or more variables. The queried model is one of the provided models. In addition, the method comprises returning, as a result of the query, a model.

Such a method improves the way a model outcome is retrieved in the course of an event. Indeed, pre-processing tasks are carried out to make the remaining computation tractable during an event. This is performed by shifting processing time and memory footprint at the time of event into a greater (but cheaper and less critical) processing time before the event, additional (but cheap) storage requirements, and a lower footprint on memory. This shift is made possible by storing the results of pre-computed analyses and later querying them during the event. Analyses consist in pre-training models with data, and results are the pre-trained models. Pre-trained models are associated with the conditions in which they are relevant (relevance conditions are metadata of the pre-trained models). Queries based on these conditions allow to retrieving the appropriate models during the course of an event for immediate use for making predictions.

When training a single model, the model must apply to every possible unfolding of events in which it is to be used. When preparing multiple models as is the case in this invention, each model may correspond to specific hypotheses on the unfolding of events. These hypotheses will typically translate into specific values of variables that describe the events. This allows to reduce the number of observations necessary to train each model. In the case where a single model is used, all observations representative of all hypotheses regarding the possible unfolding of events should be kept in the training data. In the case where multiple models are prepared, as is the case in this invention, only the observations corresponding to events consistent with the specific hypotheses corresponding to each model should be kept to train the model. These observations share the same or similar values on variables than the ones that describe the corresponding hypotheses. Since the training data is essentially responsible for the footprint on random access memory during the training of a model, preparing multiple models corresponding to specific hypotheses allows to dramatically reduce the footprint on memory for the training of each model. Hence the invention solves the memory footprint problem.

By doing the above many smaller models to train are generated, instead of one large model. If the model of choice is trained using sequential (non-parallelizable) algorithms, then breaking it down in this manner allows to run multiple smaller computations that utilize many processors, instead of one large computation that takes only one processor and leaves the others idle. Hence the invention solves the scalability problem. Heavily parallel servers or clusters are the most frequent supercomputing infrastructures today.

Pre-training multiple models based on most probable (or most game-changing) hypotheses allows to updating the model during the game with one model whose hypothesis turns out to be true. This allows changing the behavior of the model being used during the course of the event based on new data that comes up during the game, and this without the need to retrain a model, only by switching the model being used. Hence the invention solves the latency problem associated to training a model during the course of an event. As compared to changing the behavior of the model by inputting values corresponding to the new turn of events, switching the model allows to using a model that is specifically designed to handle the new turn of events, as it was prepared (and trained) specifically for this new turn of events.

This method applies to incremental and online learning algorithms as well. If an incremental or online learning algorithm is chosen, the invention allows to preparing multiple such incremental or online algorithm for specific unfolding of events. Once an incremental or online algorithm is selected, it is possible to train it continuously as the events unfold. It is even possible to continuously train selected or all online or incremental algorithms available for future selection during the course of the event, even if they are not currently selected to make predictions. Those being selected later will benefit from this continuous training.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory, the memory having recorded thereon a computer program comprising instructions for performing the method. The memory may also store a database. The memory is any hardware adapted for such storage, possibly comprising several physical distinct parts (e.g. one for the program, and possibly one for the database). The system may comprise a graphical user interface.

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally manipulates sets of observations. An observation is a set of variables, wherein each variable is associated with a value. A variable represents a state of a system or of a part of it, or the state of an element in relation with or has an influence on the system or a part of it. For instance, the variables of an observation of a car can be the temperature of the car, the oil pressure, instant fuel consumption, average fuel consumption during a race, the kind of tyres, the temperature of the air, the weather (rain, sun, snow), . . . . The variable is associated with a value that quantifies the state of the variable. An observation represents a state of the system at a given point in time. A set of observations is thus the value of the variable at different point in time. In practice, the system can belong in various and unlimited industrial fields, including: aerospace, architecture, construction, consumer goods, high-tech devices, industrial equipment, transportation, marine, and/or offshore oil/gas production or transportation. The set of observations used by the method may thus comprise the variables related to an industrial system which may be any mechanical system, such as system of a terrestrial vehicles or a part of it (including e.g. car and light truck equipment, racing cars, motorcycles, truck and motor equipment, trucks and buses, trains), a system of an aerial vehicle or a part of it (including e.g. airframe equipment, aerospace equipment, propulsion equipment, defense products, airline equipment, space equipment), a system of a naval vehicle or a part of it (including e.g. navy equipment, commercial ships, offshore equipment, yachts and workboats, marine equipment), a general mechanical system or a part of the mechanical system (including e.g. industrial manufacturing machinery, heavy mobile machinery or equipment, installed equipment, industrial equipment product, fabricated metal product, tire manufacturing product), an electro-mechanical or electronic system or a part of it (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 2:
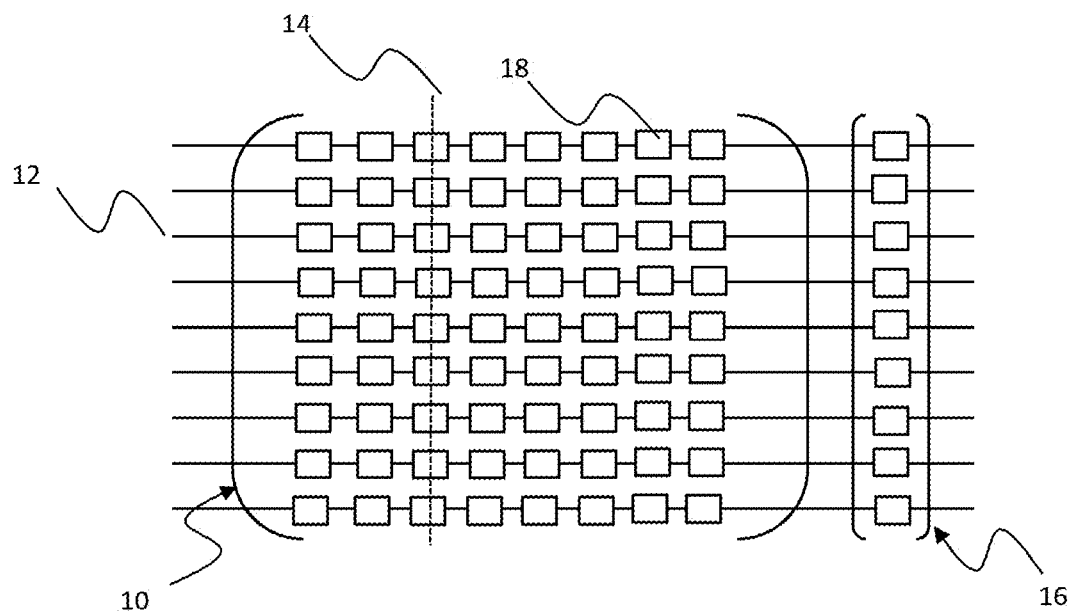
FIG. 2 shows an example of a set of observations and of the index.

FIG. 2 shows an example of observations. Each line 12 represents an observation, each column 14 (only one is represented with a dotted line in FIG. 2 for clarity reason) corresponds to a variable, and each rectangle 18 represents the value of a variable for an observation. In this example, the set of observations is stored on a matrix 10. Each observations is described with its values on so-called «descriptive variables» also known as «input variables» (because they are provided as input of a trained model to describe an observation). Interestingly, each observation of the set comprises the same variable as the other observations of the set. It is to be understood that for each observation, one or more variable can be empty, that is, not associated with a value. Each observation is associated with corresponding values on so-called «target variables» also known as «output variables». The target variables are the variables that trained models must evaluate for new observations. Target variables are meaningful for the user of the model in the sense that they provide information that help the user of the model understand and/or predict and/or react to the behavior of the system. In this example, the target variables are also stored in a matrix 16. It is to be understood that the values and the target variables of each observation can be stored in a single matrix comprising the matrices 10 and 16. The observations and the target variables form (and are referred to as) a set of tagged data. It is to be understood that each target variables is accompanied of a value so-called target value.

FIG. 2 shows an example of the index. In the example of FIG. 2, there are three models: Model 1, Model 2 and Model 3. The index comprises a list of couples (Model 1, Model ID1), (Model 2, Model ID2), (Model 3, Model ID3) and an inverted list for each variable, the inverted list being a list of couples of a value of the variable and models whose training, set is characterized by this value on the variable, as previously discussed. In the example of FIG. 2, the inverted list for the variable V1 comprises the couples (v1, [Model ID1, Model ID2]) and (v2, [Model ID1, Model ID3]). In other words, the training sets of Model 1 and Model 2 are characterized by the value v1 on the variable V1, and the training set of Model 1 and Model 3 are characterized by the value v2 on the variable V1. The inverted list for the variable V2 comprises the couple (v3, [Model ID2, Model ID3]). In other words, the training sets of Model 2 and Model 3 are characterized by the value v3 on the variable V2. The models are thereby searchable based on the values of the variables used to train them. For example, a query with the value v3 on variable V2 will return Model 2 and Model 3. It is to be understood that the index shown on FIG. 2 is only a schematic illustrating example, and that there may be more models and variables than those shown on FIG. 2.

Figure 3:
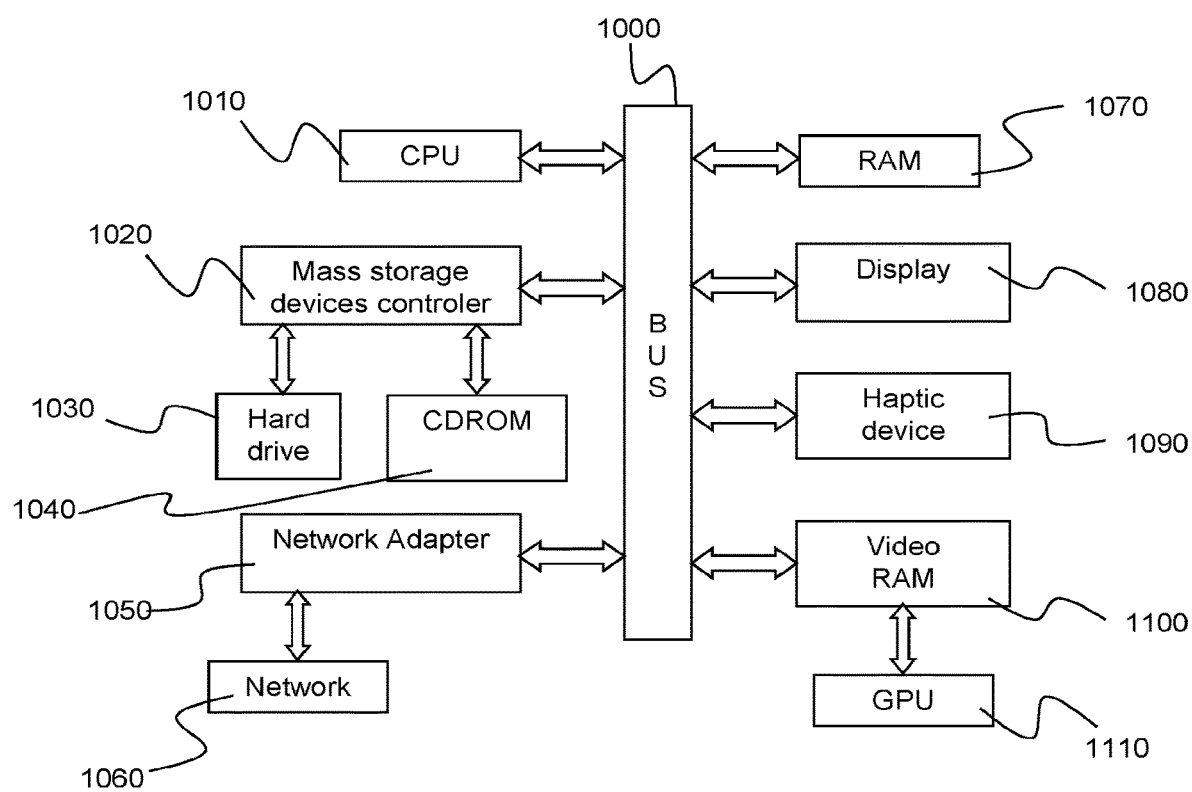
FIG. 3 shows an example of a computer.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring now to FIG. 1, it is discussed an example of the invention.

At step S10, one identifies variables of a set of observations of similar events. Similar events means that the events have common characteristics. In practice, each observation is associated with one or more variables. The common characteristics between the events can be the variables. Hence, and in reference to FIG. 2, each observation of the set of observations describes an event that is the same with the same variables, except that the variables between two observations may have different values.

The set of observations may be a natural set of observations (S104). Natural means that the values of the variables have been measured on a real event, that is, an event that occurred in the real-world, e.g. the temperature of the engine of a space shuttle. The observations and the variables of each such observation are thus collected.

The set of observations may be a synthetic set of observations (S102). Synthetic means that the values of the variables have been computed. For instance, they have been generated. There are multiple approaches for generating synthetic variables. In the following we describe two approaches.

Both approaches start with identifying the range of values that can be taken by the variables of the set of observations. Some variables can only take discrete values. These are discrete variables. Others can take continuous values. These are continuous variables.

Both approaches involve generating values on each variable of the observations, and combining these values to form synthetic observations. For example if variable A takes values [1, 2, 3] and variable B takes values [1, 2], the combinations are (1, 1), (1, 2), (2, 1), (2, 2), (3, 1), (3, 2). That is |A|*|B| combinations. In this example, six new observations can be created, each defined by its values on variables A and B, and corresponding to the six combinations of possible values of A and B.

Both approaches may involve generating a target value for each observation. The target value is the value of a target variable associated to the observation. It is typically generated by a simulation model when given the variables of the observation in input. The target variable is the variable that a machine learning algorithm learns to produce when trained with observations associated with their respective target values. By this process of learning, known in the state of the art of machine learning, the machine learning algorithm will learn to produce target values consistent with those of observations with which it was trained, in response to new observations similar to those with which it was trained.

The two approaches differ by the method used to generate values on each variable.

A first approach may consist in using random variate generators to generate values on the range of definition of a variable, possibly following a uniform distribution on the range of distribution, or following a different probability distribution according to the needs (for example, if one wants models to be particularly well trained for observations that take values similar to a value V for a specific variable, one may decide to use a probability distribution that will favor values close to V for that variable, such as a normal distribution centered around V.)

A second approach may consist in enumerating possible values for a variable on its range of possible values, possibly after approximating the variable with a discrete variable, that is, a variable that takes discrete values. This approximation can be done by approximating each value with the closest discrete value of the discrete variable. Discrete values can for instance be defined as values rounded to a specified level of precision. In practice, variables that represent a physical event only take values on a bounded range of definition: there is a lower bound and an upper bound. These bounds can be found, typically by looking at past data. A discrete variable will take a finite number of values on a bounded range of definition. This makes it possible to enumerate all possible values of the discrete approximation, if this is what one wants to achieve.

The set of observation may be a mix of natural and synthetic observations. For instance, if the number of natural observations is too small and thus not representative enough of an event, the set of observations may be completed with synthetic observations so that the set of observations is statistically representative of the set of possible observations on which the model is to be used.

Then, at step S20, a multiplicity of models are trained based on observations collected at step S104 or generated at step S102.

Each model may be trained on a subset of the observations. The subset may be obtained by filtering. The filtering is based on the values of the variables of the observations. The values that determine the filtering may be chosen with different approaches.

One approach may be to obtain a partition of the observations, each observation being used to train one and only one model. This approach may be relevant in the case where a single model is retrieved in the later step of the invention where models are retrieved. A particular case of that approach may be to group observations in clusters in which observations are as close as possible to each other within a cluster and as far as possible to observations from other clusters (with regards to a distance defined arbitrarily, according to the needs of the user). For example, clustering techniques known in the state of the art can be used to specify the values for filtering in the context of this approach. This approach may favor the minimization of the resource consumption of the system with regards to the quality of the outcome.

A different approach may be that sets of observations overlap in order to train models that are redundant for each new observation. This approach may be relevant in the case where multiple models are retrieved in the later step of the invention where models are retrieved, and the outcome of a new observation is computed by averaging (or making a vote between) the outcomes produced by the multiple models. For example, each filtering may accept half of the observations by accepting the observations whose value on a specified variable is below or above the median value of the variable. This approach may favor the quality of the outcome with regards to minimization of the resource consumption of the system.

As a result of step S20, the set of observations of step S102 and/or S104 that is stored and represented as a matrix has produced several matrices that are smaller. There may have been no loss of information from the original matrix if all the observations have been included if all the observations have been used in a set destined to train a model (this is the case in both filtering approaches described). Interestingly, each matrices of this set has a smaller footprint on memory when used to train a machine learning model (as it is smaller). In addition, subsequent independent computing operations on this set of matrices (such as using each matrix to train a model) can be parallelized.

Next, at step S30, the multiplicity of models are indexed. Variables of the observations used to train each model are indexed in the form of metadata of the model. This means that models are searchable based on the values of the variables of the observations used to train them. There are multiple approaches in the choice of the values listed in the metadata of an indexed model.

One approach consists in including in the metadata of a model the values of all variables of all observations used to train the model, such that each variable is referenced as an attribute of the model in the index, and each value on that variable corresponding to an observation used to train the model is listed in the values of that attribute. Such an index structure would typically allow to retrieving models trained with the greatest number observations with identical or similar values to the values specified in the query. Because of the structure of inverted lists used in an index, the storage space required by such an index would only grow linearly with the size of the matrix of observations.

Another approach which would be particularly relevant in the case where models are trained on observations filtered based on the fact that they belong to the same cluster, may be to add in the metadata of each model the variables of the observations, each variable being associated with the coordinate of the centroid of the cluster on that variable. A query specifying a number of variables would lead to retrieving models trained on a cluster of observations whose centroid has the same or similar values on the specified variables.

In order to support search based on the exact value of a variable, the index of models contains a list of couples (model ID, model) and an inverted list for the variable.

The inverted list corresponding to a variable is a list of couples (value, [model $ID_1$, ..., model $ID_N$]) where [model $ID_1$, ..., model $ID_N$] is the list of trained model ids corresponding to the models whose training set is characterized by value value on the variable (this could mean for instance that its centroid has coordinate value on the variable, or that one of its observations has value value on the variable, or else, depending on the approach). This structure allows retrieving of models faster upon a query that specifies the values of variables. Indeed, the inverted lists are sorted so it is quicker to find the specified value in a sorted inverted list than to look through all models and check their corresponding associated values.

In order to support search for similar values in an index with inverted lists, one approach is to discretize values before adding them to the inverted lists, and search for all discrete values within a distance of the value specified in the query. In this context, discretizing values means approximating them with rounded values at a precision level smaller than the distance.

The steps S10 to S30 form the build time of the invention. The build time is also referred to as pre-processing tasks. The pre-processing tasks are discussed above.

Now the steps S40 to S80 are discussed and they form the run time of the invention.

At step S40, data related to one or more second set of observations are collected. The second set of observations represents events that are similar to the events stored in the observations of step S10. The observations of the second set comprises at least the same variables as the set of observations of step S10. For the sake of explanation, similar events means that the events have common characteristics. In practice, the collected data are observations of similar events, each observation being associated with one or more variables. The common characteristics between the events can be the variables. Hence, each observation of the second set of observations describes an event that is similar with the same variables, excepted that the variables between two observations may have different values.

The collection of the data is performed the same way as for the set of observation of step S10; however, the values are measured only, that is, the second set observations only comprises values of the variables that have been measured on a real event. The measured values of the measured variables are preferably transmitted in real time to the system that performs the method. This can be done by means of subscription to real time push notifications from data providers or sensors via any telecommunication channel, and subscription or messaging protocol. It is to be understood that the channel typically depends on the interface provided by the data provider or sensors. Here, the term real-time means that the time for transferring the collected data is a pre-determined period of time; the time required for the transfer should not exceed the pre-determined time period.

The set of observations may comprise observations on past similar events, while the second set of observations comprises observation on current similar events.

Then, at step S50, at least one trained model that is indexed is queried. The query is performed according to one or more variables that were collected at step S40.

The variables comprised in the query are typically slowly moving variables, i.e. the variables whose values change slowly in successive observations. Models should be relevant for all observations on which they are applied to estimate outcomes. They are appropriate if they were trained on similar observations. If recent observations share similar values on some variables, it is a good idea to select a model that was trained on observations that also share similar values on the same variables. For instance, if the models being used are changed (queried) every 10 min and events are collected every second, variables that have shown relatively stable values across the 600 past collected events are good candidates to be included in the query for the next model.

As a result of the query, at least one trained model is returned. However, it is possible that more than one model matches with the request, and therefore two or more trained model might be returned. Thus, at step S60, it is determined whether more than one trained model matches the query.

In the event only one trained model is returned, the trained model is used to generate an outcome, at step S90 that will be discussed below. In the event two or more trained model are returned, it is determined how the outcome is generated from the multiple models.

The selection of the trained model to be kept may be performed as follows. There are at least two approaches to select models in response to a query. In a first approach, only one model is selected. The picked model is the highest ranking (S70) based on a proximity measure between the values of the variables in its metadata and the value of the corresponding variables in the query (typically the query represents the current event).

In a second approach, multiple models are selected. In this approach, too, model may be selected based on the proximity measure between the values of the variables in their metadata and the value of the corresponding variables in the query (typically the query represents the current event). For example the N highest ranking models based on the proximity measure described above are selected. Alternatively, for example, the models whose measure of proximity with the query is below or above a certain threshold are selected.

Then, at step S80, one or more observations are inputted to the selected models. Each observation comprises at least one input variable with a value. In practice, the input variable(s) of an observation are observed values of selected variables of the second set of observations collected.

Next, at step S90, an outcome is computed for the observations inputted to the models. Each selected model returns an output, also called a target value. The target value is typically used to assess the observation. For example, the target value can be a prediction on future events given the observation, or a classification of the observations to distinguish the inputted observation from other observations. It can be a metric describing the observation.

If only one model selected at step S60-S70, the outcome of the observation is a function of its output in response to receiving the observation in input. Typically, the outcome of the observation is the output of the model in response to receiving the observation in input.

If multiple models are selected at step S60, the outcome of the observation is a function of the outputs of the models in response to receiving the observation in input. For example, if the output of each model is a class (if the models provide a classification of the observations), the outcome can be the class the most represented in the outputs of the selected models, i.e., the outcome is the result of a vote from the models. Each vote can be weighted by a function of the similarity measure between the model and the query computed at step S60, so that more relevant models contribute more to the vote. If the output of each model is a numerical value, the outcome can be the average of the outputted metrics of the models. Similarly, the average can be weighted by the respective relevance of the models as computed in step S60.

It is now discussed an example of the invention helping mission control crew and on-board crew to take decisions during the operation of an orbiter for the launch of a satellite.

It is true that in these operations, most actions are effected according to automated programs and planned procedures: set of guidelines and planned events are in the Flight Data File. The Flight Data File includes the crew activity plan, payload handbooks, and other documents which are put together during the elaborate flight planning process. Types of problems are segmented and actions are planned in advance with the objective to anticipate every type of problems.

However, the mission control crew and on-board crew still need to take decisions at all times. For example, NASA states that among all abort modes, the abort-to-orbit is the preferred mode when possible, and one reason is that it gives controllers and flight crew the time to assess the situation, and decide to land or continue as planned, and how fix the problem. However this time is expensive as the mission is on hold, resources are being consumed, and the problem may be aggravating. When abort-to-orbit is not possible, the speed and quality of the decisions are even more important.

Several variables can be measured for a space shuttle: engine throttle for each engine, fuel levels for each engine, cabin pressure (problem if depressurization), status of orbiter cooling systems (problem if loss of one), altitude, flight path angle, heading, weight, velocity/range, pressures on the vehicle's surface, electrical system status, current procedure (countdown/first stage/second stage/Return to Launch Site/Trans-Atlantic Abort Landing/Abort Once Around/Abort to Orbit/Contingency Abort/Extra-vehicular activity), and so on. Still in this example, actionable variables include: engine throttle for each engine system, fuel levels (fuel can be dumped, weight (material can be dumped), choice of maneuver (to change altitude, attitude, flight angle, heading, etc), choice of procedure, and choice of orbit.

In this context, the present invention can be applied to retrieve estimated outcomes of events such as the estimated chance of placing the satellite on the right orbit, landing without risk when coming back to earth, minimizing the overall cost of the mission, for instance by minimizing damages to the material, and minimizing incidents in the interior of the cabin susceptible to result in injuries or casualties of crew members. A number of observations are generated or collected and a number of machine learning algorithms are trained with subsets of these observations, and indexed. All variables listed above form the input variables of the machine learning algorithms, and the output of the machine learning algorithm estimates the outcome of the observations.

Each model in the index corresponds to a situation that is entirely described by the variables defined above and their values. In order to query a model from the index, those variables and their values are added to the metadata associated to the corresponding model. For instance a model that applies to a situation where a component of the cooling system is out-of-order after 8 min of flight, when altitude is 60 miles, and shuttle speed is 16,697 mph, will be indexed with these properties in its metadata. This allows the right model to be queried according to the situation. Again, the indexed model can be a simulation model or a machine learning model. An advantage of training a machine learning model on options evaluated by simulations, and indexing the machine learning model instead of indexing the simulation model, is that the machine learning model will generally be quicker to execute (to assess possible options) as compared to a full simulation. The advantage of pre-computing and indexing a machine learning model is that it is not necessary to train the model in the course of the action (thus saving time).

For instance, this can be used to answer a question such as: "which is the preferred orbit for an Abort-to-Orbit mode?" Or: "which is the preferred abort mode?" in a case where multiple abort modes are possible.

For instance, models trained to assess abort modes will take in input observations that specify the abort mode (in one variable) and the context in which it is selected (in the other variables). It is the context that makes the abort mode relevant or not, and the relevance of each abort mode in their respective contexts is assessed by the outcome of the model when receiving the corresponding observations in input. The most relevant models to produce this outcome will be selected in response to an automated query to the index specifying the current situation (flight stage, altitude, speed, etc., all of those variables being in the metadata of the index to allow for the query) and will be executed on observations representative of multiple choices of abort modes in their common context to estimate their outcomes.

The invention claimed is:

1. A computer-implemented method for retrieving model outcomes in the course of an event, comprising:
    obtaining a first set of observations of similar events, each observation being a set of mathematical variables each associated with a value, similar events being events having common mathematical variables;
    obtaining a multiplicity of models;
    training, by one or more processors, the multiplicity of models based on the mathematical variables of the first set of observations, by:
        computing subsets of the observations of the first set by applying a filtering on the mathematical variables of the first set of observations, the filtering being based on the values of the mathematical variables of the observations of the first set,
        training each model of the multiplicity of models on a respective one of the subsets of the observations of the first set, and
        indexing the multiplicity of models, including indexing each model of the multiplicity of models by the values of the mathematical variables of the subset of observations used to train the model, the indexing by the mathematical variables of the subset of observations being in the form of metadata of the model such that the model is searchable based on the values of the mathematical variables of the subset:
    collecting a second set of observations representing events that are similar to the events of the first set, the observations of the second set comprising at least the same mathematical variables as the first set;
    querying for at least one model by performing a query that includes one or more mathematical variables of the second set of observations and that allows for the retrieval of a model based on a match between values of the mathematical variables used in indexing the model and values of the mathematical variables in the query; and
    returning, as a result of the query, the at least one model.

2. The computer-implemented method of claim 1, further comprising:
    determining that two or more models are returned; and
    ranking the returned two or more models, the ranking being based on the mathematical variables of the mathematical variables of the returned two or more models.

3. The computer-implemented method of claim 2, wherein the returned two or more models are ranked by:
    computing, for each returned model, a distance based on a proximity measure between the values of the mathematical variables of the model and the values of the corresponding one or more mathematical variables in the query.

4. The computer-implemented method of claim 1, wherein the method further comprises building the first set of observations the building of the first set of observations including generating the outcome of at least one observation from a simulation.

5. The computer-implemented method of claim 4, wherein at least one observation of the first set is randomly generated.

6. The computer-implemented method of claim 1, farther comprising:

obtaining one or more observations, each mathematical variable of the provided one or more observations being set with a value; and computing an outcome for each one of the one or more observations, the computation being performed by applying the returned model on the mathematical variables set with a value of the provided one or more observations.

7. The computer-implemented method of claim 6, wherein at least two observations are provided and further comprising:

ranking the outcomes computed for the provided one or more observations; and selecting one of the provided at least two observations that is associated with the outcome having the highest ranking.

8. The computer-implemented method of claim 1, wherein the model is a simulation model or a machine learning model.

9. A non-transitory computer readable storage medium having recorded thereon a computer program that when executed by a computer causes the computer to implement a method for retrieving model outcomes in the course of an event, the method comprising:

obtaining a first set of observations of similar events, each observation being a set of mathematical variables each associated with a value, similar events being events having common mathematical variables;

obtaining a multiplicity of models;

training, by one or more processors, the multiplicity of models based on the mathematical variables of the first set of observations, by:

computing subsets of the observations of the first set by applying a filtering on the mathematical variables of the first set of observations, the filtering being based on the values of the mathematical variables of the observations of the first set, training each model of the multiplicity of models on a respective one of the subsets of the observations of the first set, and indexing the multiplicity of models, including indexing each model of the multiplicity of models by the values of the mathematical variables of the subset of observations used to train the model, the indexing by the mathematical variables of the subset of observations being in the form of metadata of the model such that the model is searchable based on the values of the mathematical variables of the subset;

collecting a second set of observations representing events that are similar to the events of the first set, the observations of the second set comprising at least the same mathematical variables as the first set;

querying for at least one model by performing a query that includes one or more mathematical variables of the second set of observations and that allows for the retrieval of a model based on a match between values of the mathematical variables used in indexing the model and values of the mathematical variables in the query; and returning, as a result of the query, the at least one model.

10. A server comprising:

processing circuitry coupled to a memory, the memory having recorded thereon the computer program for retrieving model outcomes in the course of an event, the processing circuitry implementing the computer program by being configured to obtain a first set of observations of similar events, each observation being a set of mathematical variables each associated with a value, similar events being events having common mathematical variables;

obtain a multiplicity of models;

train, by one or more processors, the multiplicity of models based on the mathematical variables of the first set of observations, by the processing circuitry being further configured to:

compute subsets of the observations of the first set by applying a filtering on the mathematical variables of the first set of observations, the filtering being based on the values of the mathematical variables of the observations of the first set, train each model of the multiplicity of models on a respective one of the subsets of the observations of the first set, and index the multiplicity of models, including indexing each model of the multiplicity of models by the values of the mathematical variables of the subset of observations used to train the model, the indexing by the mathematical variables of the subset of observations being in the form of metadata of the model such that the model is searchable based on the values of the mathematical variables of the subset;

collect a second set of observations representing events that are similar to the events of the first set, the observations of the second set comprising at least the same mathematical variables as the first set;

query for at least one model by performing a query that includes one or more mathematical variables of the second set of observations and that allows for the retrieval of a model based on a match between values of the mathematical variables used in indexing the model and values of the mathematical variables in the query; and return, as a result of the query, the at least one model.

11. The server of claim 10, the processing circuitry is further configured to receive the query from a client computer to which the server is connected, the query being generated on the client computer.

* * * * *